United States Patent [19]
Murray

[11] 3,815,277
[45] June 11, 1974

[54] AERATED BAIT CONTAINER
[75] Inventor: William B. Murray, Houston, Tex.
[73] Assignee: Sportcraft, Inc., Houston, Tex.
[22] Filed: Jan. 26, 1973
[21] Appl. No.: 327,088

[52] U.S. Cl. ................................................. 43/57
[51] Int. Cl. .......................................... A01k 97/04
[58] Field of Search ................. 43/56, 57; 119/3, 5; 261/121 M, 36 R; 210/169

[56] References Cited
UNITED STATES PATENTS

| | | | |
|---|---|---|---|
| 2,466,570 | 4/1949 | Blicker et al. | 43/57 |
| 2,951,309 | 9/1960 | Briscoe | 43/57 |
| 3,136,087 | 6/1964 | Scroggins | 43/57 |
| 3,292,579 | 12/1966 | Buchanan | 119/5 |
| 3,302,789 | 2/1967 | Holt | 119/5 |
| 3,323,249 | 6/1967 | Randall | 43/57 |
| 3,374,990 | 3/1968 | Gray | 43/57 |

Primary Examiner—Warner H. Camp
Attorney, Agent, or Firm—Robert W. B. Dickerson

[57] ABSTRACT

A container or bait bucket or pail has a pump mounted therein with a suction inlet at a substantial elevation, but below water level, and with a discharge line extending first upwardly and then over to provide downwardly directed discharge ports spaced above water level to discharge water downwardly through air space for aeration. Thence, the discharge line turns downwardly to discharge further water through ports just above the bottom of the bucket, thereby to direct flow stream water to circulate and keep stirred up the bait, as shrimps, which might otherwise stack up at the bottom of the bucket and smother each other.

9 Claims, 4 Drawing Figures

PATENTED JUN 11 1974 3,815,277
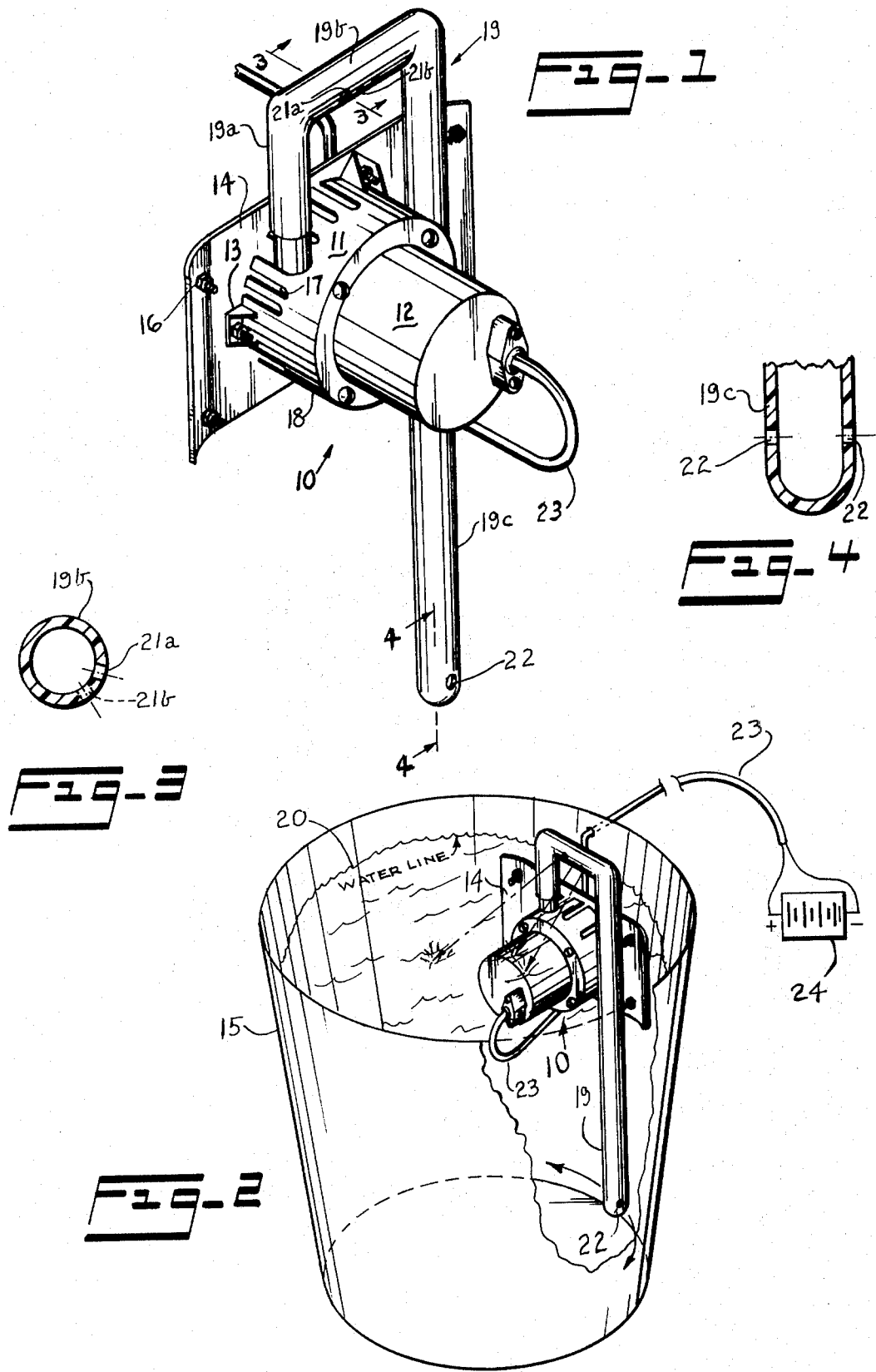

AERATED BAIT CONTAINER

BACKGROUND OF THE INVENTION

The present invention relates generally to aerated bait containers, or bait buckets, of the type where it is desired to keep an amount of water, in which the bait is immersed, in use for some period of time, as for the duration of a fishing trip or boating, for several hours. Otherwise, with bait in a container where the water is not changed, and not aerated, the water becomes stale, and in degree contaminated by the bait, and also the bait tend to stack up on each other, in the lower spaces of the container, causing some suffocation and death of bait from the contaminated, stagnant, unaerated and uncirculated water.

Heretofore, steps in degree have been taken, as by B. T. Wall in U.S. Pat. No. 2,515,538, issued July 18, 1950; also by C. H. Holmes and J. F. Snyder, in U.S. Pat. No. 2,533,936, issued Dec. 12, 1950; also by J. H. Butler and Charles E. Atherton, U.S. Pat. No. 2,936,542, issued May 17, 1960; and more recently by E. S. Niewiarowicz, U.S. Pat. No. 3,279,768, issued Oct. 18, 1966. However none of these inventors have placed in combination such an aerated bait container as that provided by the applicant, especially in that the discharge line provides one set of ports that discharges water downwardly through air space; upon the water level, to aerate the water, while the discharge line continued on downwardly through the water, to lower discharge line parts disposed just above the bottom of the container, thus to circulate in flow stream directions to keep the bait stirred up, thus to avoid the bait stacking up with lowermost bait being subject to smothering and/or death through stagnant, bottom space water.

SUMMARY OF THE INVENTION

The invention relates to an aerated bait container which circulates water downwardly from a discharge line above water level, to aerate the water discharged through upper discharge ports, and also the discharge line continues to discharge through lower discharge ports just above the bottom of the container, to set discharge flow streams in motion and direction to keep the bait stirred up from settling on the bottom of the container.

Thus, as a primary object, the invention provides an aerated bait container with a single discharge which aerates the water through upper ports and keeps the bait stirred up by means of flow streams set in motion by lower port discharge just above the bottom of the container.

As a further object, the invention provides an aerated bait container of this class in the form of a bucket, with bail, which mounts therein a motorized pump with suction below water level, the motor being connectable by suitable conductors therefrom, to an external source of electrical power.

Other and further objects will be apparent when the invention hereinbelow described in detail, is considered with relation to the drawings.

BRIEF DESCRIPTION OF THE DRAWINGS

FIG. 1 is an isometric view of a pump with driving motor, and pump mounting bracket, suction inlet ports, and discharge line.

FIG. 2 is an isometric view of the pump shown in FIG. 1, as mounted in a container, as a bucket, with a battery, shown diagrammatically, as the source of pump motor drive.

FIG. 3 is a sectional elevational view, taken along line 3—3 of FIG. 1, showing upper discharge port relationships.

FIG. 4 is a sectional elevational view, taken along line 4—4 of FIG. 1, showing lower discharge port relationships.

DESCRIPTION OF THE INVENTION

As shown in FIG. 1, a water circulator 10 is shown as comprising a pump 11 driven by a conventional small horsepower motor 12 mounted to, and in co-axial alignment with the pump. The base of the pump 11, opposite the motor 12, includes mounting lugs 13 through which it is connected to a mounting plate or bracket 14. A bucket, pail or container 15, which may have a bail, not shown, is depicted in FIG. 2 as having a circulator 10, as shown in FIG. 1, mounted therewithin, near the top of the container, suitable bolts being passed through the side or wall of the container, and through matching holes in the plate or bracket 14, with nuts 16, shown in both FIGS. 1 and 2, serving to complete the connection of circulator mounting plate 14 with the container 15.

The pump 11 is indicated as being of a conventional type with suction water being drawn thereinto through a plurality of slots 17 in the base (outer) portion of the pump housing 18, to pass through inner passage means, not shown, to be discharged by conventional impeller means, also not shown, to pass upwardly through a discharge port into a discharge conduit 19. The discharge conduit first receives discharge water into a short riser 19a that extends upwardly above the normal water level 20, and connects into a horizontally extending discharge runner section 19b, having a plurality of upper discharge ports 21a, 21b, therein, for water discharge angularly downwardly upon the water level surface 20. This water passage through air space results in this water, discharged through the upper discharge ports, entrapping, or carrying along therewith back into the water in the container, some sufficiency of air so that it may be asserted that the container water is adequately aerated. Considering FIG. 1 with relation to FIG. 3, the upper discharge ports are longitudinally spaced along the discharge runner section 19b in staggered relationships, thereby providing a pattern of different angles of downward discharge through the aeration space. Obviously, water circulation patterns are set up by such discharge.

The discharge conduit 19 includes a terminal vertical section 19c, that extends from the horizontally extending section 19b, oppositely from the section 19a, and reaches substantially into closed bottom contact with the bottom of the inside of the bucket 15. Slightly above the bottom, the vertical section 19c has opposed lower discharge ports 22 therein, to pass out water in peripherally directed flow paths or streams, as indicated by the arrows in FIG. 2. This lower discharge of water, as directed, and the circulation induced thereby, is in such force as to militate against the bait in the bottom of the bucket 15 settling, as one upon the other, thus causing smothering of the bait that is lowermost. Also, and optionally, lower discharge may be so forcefully directed, as an additional or as an alternately directed discharge, that its direction more radially inwardly toward the center of the bucket, may result in keeping the bait, as, say shrimps, from settling on bucket bottom surface areas.

An insulated conductor cord 23 is shown in FIG. 1, as extending from the housing of the motor 12. As shown in FIG. 2, this cord 23 extends to an electrical storage battery 24, shown diagrammatically in FIG. 2, with the positive and negative side conductors from within the insulative cord 23, being connected to the respective opposite terminals of the battery 24. Optionally, any other source of power may be employed to drive the motor of the pump, as for example through available power outlets, with or without d/c converters.

The invention shows the bucket 15 as being opaque, but optionally it may be of a transparent material to provide a view of the condition of the shrimp. Many other optional structural arrangements fall within the spirit of this invention, and it is not limited to disclosures made.

I claim:

1. Combination fluid aerating and circulating device, comprising:
   a motor driven pump member, said pump member including fluid inlet means adapted to be positioned below fluid level, and also including fluid discharge means;
   fluid conduit means in communication with said fluid discharge means, said conduit means comprising a continuous line having upper fluid discharge port means adapted to jet aerating fluid therefrom, said upper discharge port means being positioned above said fluid inlet means, and also having lower fluid discharge port means adapted to jet circulating fluid therefrom, said lower discharge port means being positioned below said fluid inlet means.

2. The device of claim 1 wherein said conduit means is of sufficient height such that when the device is immersed in a fluid containing container, said upper discharge port means will be positioned above the level of said fluid, said fluid inlet means will be positioned below said fluid level, and said lower discharge port means will be positioned below said fluid inlet means and near the bottom of such container.

3. The device of claim 1 wherein said upper fluid discharge port means comprises a plurality of staggered apertures through one wall of sai continuous line.

4. The device of claim 1 where said lower discharge port means includes a pair of oppositely disposed passageways through the wall of said continuous line.

5. The device of claim 1 wherein said upper fluid discharge port means comprises a plurality of staggered apertures through one wall of said continuous line, and said lower discharge port means includes a pair of oppositely disposed passageways through the wall of said continuous line.

6. The device of claim 1 and including a fluid container, said pump member being removably affixed to said container.

7. The device of claim 6 wherein said container is opaque.

8. The device of claim 6 and including electrical leads coupling said motor with an external source of power.

9. The device of claim 8 wherein said leads pass through an aperture provided through one wall of said container.

* * * * *